United States Patent
Maeda

(10) Patent No.: US 10,969,672 B2
(45) Date of Patent: Apr. 6, 2021

(54) LIGHT SOURCE DEVICE AND PROJECTION DISPLAY APPARATUS USING LIGHT SOURCE DEVICE

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/885,061

(22) Filed: May 27, 2020

(65) Prior Publication Data
US 2020/0379329 A1  Dec. 3, 2020

(30) Foreign Application Priority Data

May 28, 2019 (JP) .............................. JP2019-099721

(51) Int. Cl.
*G03B 21/14* (2006.01)
*H04N 9/31* (2006.01)
*G03B 21/20* (2006.01)

(52) U.S. Cl.
CPC ....... *G03B 21/204* (2013.01); *G03B 21/2066* (2013.01); *G03B 21/2073* (2013.01); *H04N 9/3158* (2013.01); *H04N 9/3161* (2013.01)

(58) Field of Classification Search
CPC .. G03B 21/14; G03B 21/204; G03B 21/2066; G03B 21/2073; H04N 9/3158; H04N 9/3161
See application file for complete search history.

(56) References Cited

U.S. PATENT DOCUMENTS

| 9,927,685 B2 * | 3/2018 | Liao | ...................... G02B 27/141 |
| 2014/0285774 A1 * | 9/2014 | Tajiri | ................... G03B 21/208 |
| | | | 353/38 |

FOREIGN PATENT DOCUMENTS

| JP | 2015-106130 A | 6/2015 |
| JP | 2018-13662 A | 1/2018 |
| JP | 2018-40961 A | 3/2018 |
| JP | 2019-133080 A | 8/2019 |

* cited by examiner

*Primary Examiner* — William C. Dowling
(74) *Attorney, Agent, or Firm* — Canon U.S.A., Inc. IP Division

(57) ABSTRACT

A light source device includes a light source unit configured to emit light of a first wavelength band, a light guide unit, a wavelength conversion unit configured to convert the light emitted from the light source unit into light of a second wavelength band different from the first wavelength band, and a diffusion unit configured to diffuse the light emitted from the light source unit. The light guide unit includes a first portion and a second portion. The first portion is configured to guide a part of the light emitted from the light source unit to the wavelength conversion unit, to guide remainder to the diffusion unit, and to guide light from the diffusion unit to a system in a subsequent stage. The second portion is configured to guide light from the wavelength conversion unit to the system in the subsequent stage.

23 Claims, 11 Drawing Sheets

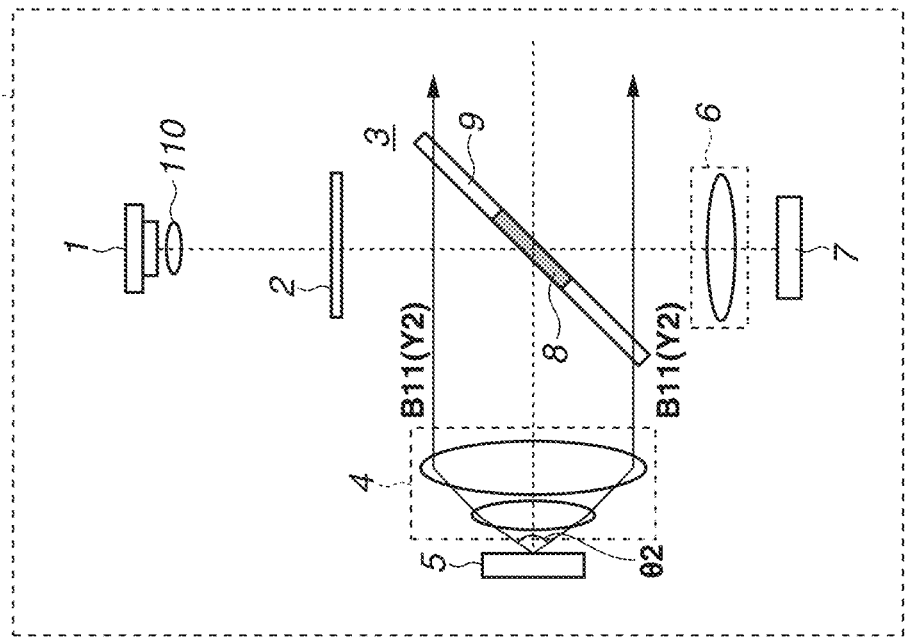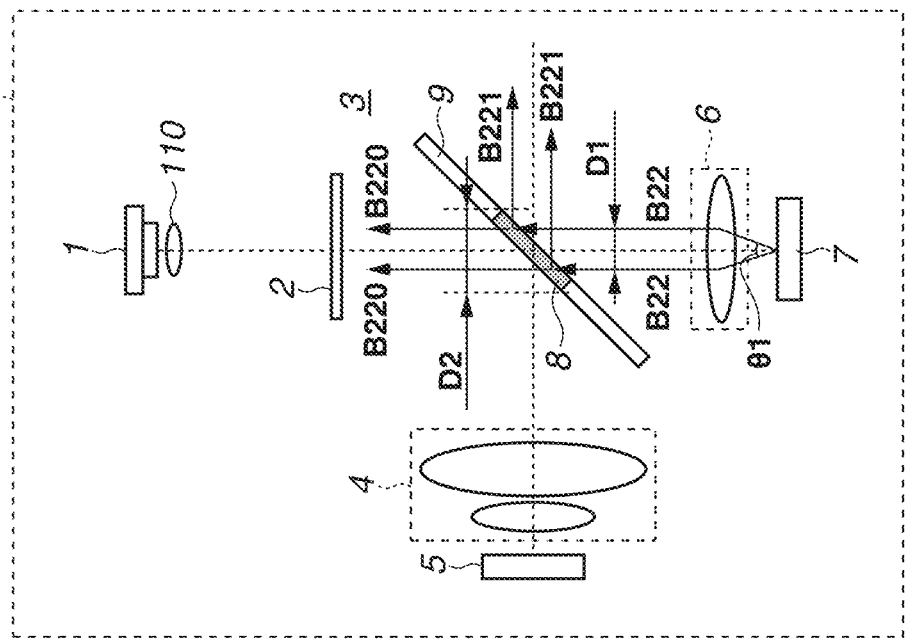

LIGHT SOURCE DEVICE AND PROJECTION DISPLAY APPARATUS USING LIGHT SOURCE DEVICE

BACKGROUND

Technical Field

One disclosed aspect of the embodiments relates to a light source device and a projection display apparatus using the light source device.

Description of the Related Art

A projector discussed in Japanese Patent Application Laid-Open No. 2015-106130 is known as a projector that can project a color image by using a blue laser diode (hereinafter, blue LD) emitting blue light and a yellow phosphor converting a part of the blue light emitted from the blue LD into yellow light.

In the projector discussed in Japanese Patent Application Laid-Open No. 2015-106130, S-polarized light emitted from the blue LD is converted into mixed light of an S-polarized light component and a P-polarized light component using a rotatable half-wave plate. The S-polarized light component of the above-described mixed light is guided to the yellow phosphor and the P-polarized light component is guided to a diffuser by a polarization separation device having a polarization separation function to the light incident from the blue LD. Finally, yellow light from the yellow phosphor and the blue light from the diffuser are combined by the above-described polarization separation device to generate white light.

In Japanese Patent Application Laid-Open No. 2015-106130, the polarization separation device has a function to transmit the yellow light irrespective of a polarization direction, in addition to the polarization separation function for the light incident from the blue LD. This function is for guiding most of the yellow light generated from the S-polarized light component to a system in a subsequent stage, the S-polarized light being guided from the polarization separation device to the yellow phosphor.

As discussed in Japanese Patent Application Laid-Open No. 2015-106130, the configuration of the polarization separation device becomes complicated, in a case where both of the polarization separation function to light of a specific wavelength and the function to transmit or reflect light of other than the specific wavelength irrespective of the polarization direction are imparted to the polarization separation device.

SUMMARY

According to an aspect of the embodiments, a light source device includes a light source unit, a light guide unit, a wavelength conversion unit, and a diffusion unit. The light source unit is configured to emit light of a first wavelength band. The light guide unit is configured to guide at least a part of the light emitted from the light source unit in a direction different from an emission direction of the light source unit. The wavelength conversion unit is configured to convert at least a part of light guided in a first direction by the light guide unit out of the light from the light source unit, into light of a second wavelength band different from the first wavelength band. The diffusion unit is configured to diffuse at least a part of light guided in a second direction different from the first direction by the light guide unit out of the light emitted from the light source unit. The light guide unit includes a first portion receiving the light emitted from the light source unit, and a second portion receiving the light from the wavelength conversion unit. The first portion is configured to guide a part of the light emitted from the light source unit to the wavelength conversion unit, to guide remainder to the diffusion unit, and to guide light from the diffusion unit in a third direction that is different from the emission direction of the light source unit and is different from the first direction and the second direction. The second portion is configured to guide light from the wavelength conversion unit in the third direction.

Further features of the disclosure will become apparent from the following description of exemplary embodiments with reference to the attached drawings.

BRIEF DESCRIPTION OF THE DRAWINGS

FIGS. 6A and 6B are diagrams illustrating a more preferable configuration of the light source device according to the first exemplary embodiment.

DESCRIPTION OF THE EMBODIMENTS

Some exemplary embodiments of the disclosure are described below with reference to drawings.

(Configuration of Projection Display Apparatus)

Figure 1:
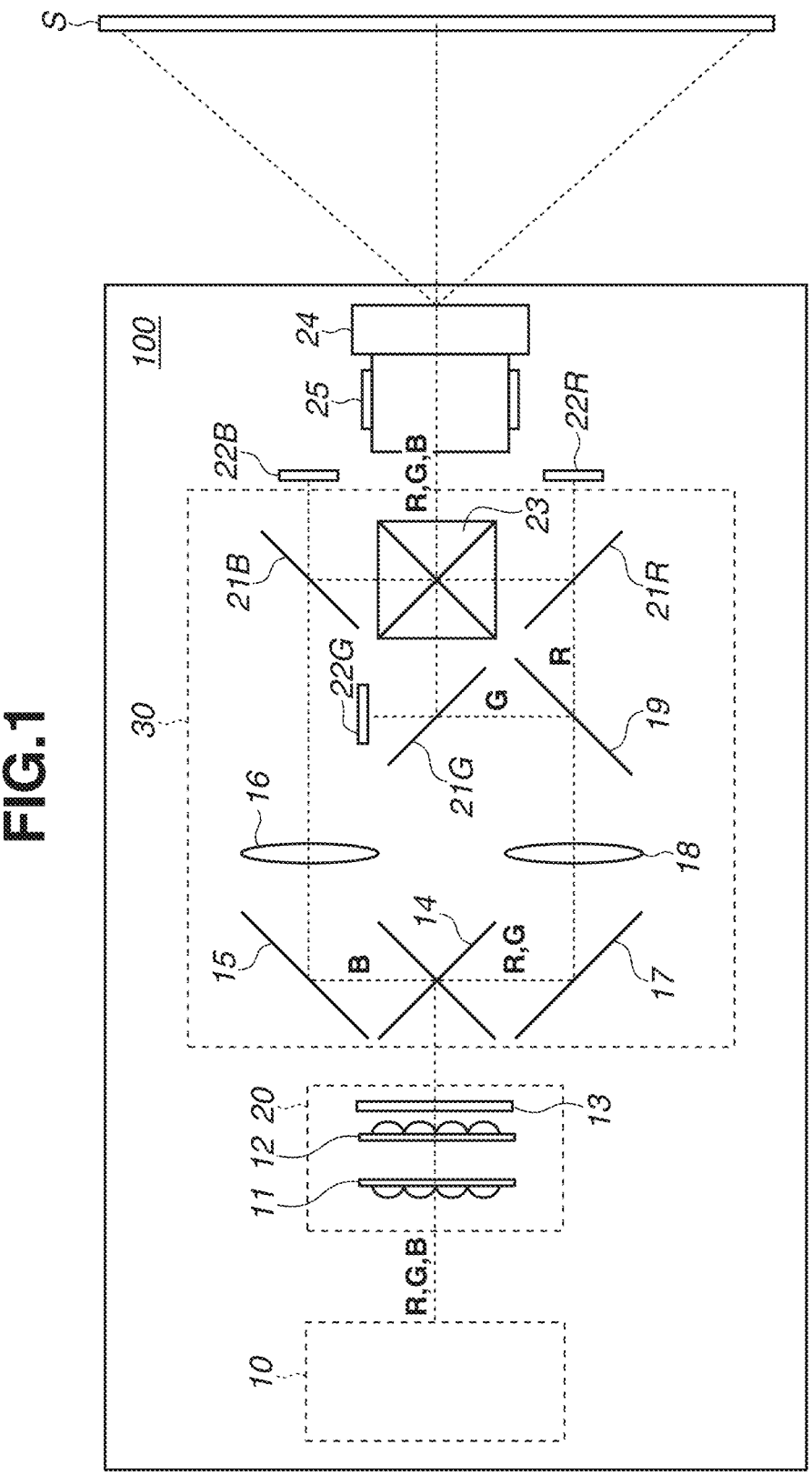
FIG. 1 is a diagram illustrating a projector that can be mounted with a light source device according to each of exemplary embodiments.

First, a configuration of a projector (projection display apparatus) 100 that can be mounted with a light source device according to each of the exemplary embodiments described below is described with reference to FIG. 1.

The projector 100 includes a light source device 10, a light modulation unit that modulates light emitted from the light source device 10, and a holding unit 25 that holds a projection lens (projection optical system) 24 projecting an image to a screen (projection surface) S.

The light modulation unit includes a red light modulation unit 22R, a green light modulation unit 22G, and a blue light modulation unit 22B that are described below. The red light modulation unit 22R, the green light modulation unit 22G, and the blue light modulation unit 22B are each a reflective liquid crystal panel.

The holding unit 25 may detachably hold the projection lens 24, or the holding unit 25 may be configured such that the projection lens 24 is not detachable from the holding unit 25. Further, the holding unit 25 may be configured so as to shift the projection lens 24 in a direction orthogonal to an optical axis of the projection lens 24 while holding the projection lens 24.

The projector 100 further includes an illumination optical system 20, a color separating/combining system 30, and the projection lens 24. The illumination optical system 20 includes a first fly-eye lens 11, a second fly-eye lens 12, and a polarization conversion unit 13, which are described below. The illumination optical system 20 illuminates the light modulation unit with the light emitted from the light source device 10.

The color separating/combining system 30 includes a cross dichroic mirror 14, mirrors 15 and 17, a dichroic mirror 19, condenser lenses 16 and 18, polarization beam splitters (PBSs) 21R, 21G, and 21B, and a combining prism 23 that are described below.

(Description of Optical Path)

White light including red light R, green light G, and blue light B from the light source device 10 is guided to the color separating/combining system 30 and the light modulation unit through the illumination optical system 20. The white light emitted from the light source device 10 is divided into a plurality of light fluxes by the first fly-eye lens 11, and the plurality of light fluxes is superimposed on an illuminated plane of the light modulation unit through the second fly-eye lens 12 and one of the condenser lenses 16 and 18. Consequently, the light modulation unit can be illuminated with uniform illuminance. Further, a polarization direction of the light from the second fly-eye lens 12 is converted into a predetermined polarization direction by the polarization conversion unit 13. In the projector 100, the polarization direction is converted into a polarization direction passing through the PBSs 21R, 21G, and 21B.

An optical path of each of the red light R, the green light G, and the blue light B in a case where the red light R, the green light G, and the blue light B are projected to the screen S is described below.

(Optical Path of Red Light)

The red light R of the white light emitted from the illumination optical system 20 is guided to the mirror 17 by the cross dichroic mirror 14. The red light R from the mirror 17 passes through the condenser lens 18, the dichroic mirror 19, and the PBS 21R, and enters the red light modulation unit 22R. The red light R that has been modulated and changed in polarization direction by the red light modulation unit 22R is reflected by the PBS 21R, and is projected to the screen S through the combining prism 23 and the projection lens 24. The combining prism 23 is a cross dichroic prism.

(Optical Path of Green Light)

The green light G of the white light from the illumination optical system 20 is guided to the mirror 17 by the cross dichroic mirror 14. The green light G from the mirror 17 passes through the condenser lens 18, passes through the PBS 21G being reflected by the dichroic mirror 19, and enters the green light modulation unit 22G. The green light G that has been modulated and changed in polarization direction by the green light modulation unit 22G is reflected by the PBS 21G, and is projected to the screen S through the combining prism 23 and the projection lens 24.

(Optical Path of Blue Light)

The blue light B of the white light emitted from the illumination optical system 20 is guided to the mirror 15 by the cross dichroic mirror 14. The blue light B from the mirror 15 passes through the condenser lens 16 and the PBS 21B, and enters the blue light modulation unit 22B. The blue light B that has been modulated and changed in polarization direction by the blue light modulation unit 22B is reflected by the PBS 21B, and is projected to the screen S through the combining prism 23 and the projection lens 24.

The color image can be displayed on the screen S by the red light R, the green light G, and the blue light B that are projected to the screen S through the above-described respective optical paths. For example, when a black image is to be displayed on the screen S, the light modulation units need not modulate the red light R, the green light G, and the blue light B.

The projector 100 described above is a so-called reflective liquid crystal projector having a reflective liquid crystal panel. However, the light source device in each of the exemplary embodiments described below may be mounted on, for example, a so-called transmission liquid crystal projector having a transmission liquid crystal panel or a projector having a micromirror device, other than the projector 100.

(Configuration of Light Source Device)

A configuration of the light source device 10 according to a first exemplary embodiment of the disclosure is described with reference to FIGS. 2A to 2D, 3, 4, 5A, 5B, 6A and 6B.

As illustrated in FIGS. 2A to 2D, the light source device 10 includes a blue laser diode (LD) (light source unit) 1, a collimator lens 110 that converts blue light B (light of first wavelength band) from the blue LD 1 into parallel light, and a diffusing plate 2 that diffuses the blue light B from the collimator lens 110. The blue light B from the blue LD 1 has a wavelength of 455 nm; however, the wavelength of the blue light B is not limited thereto. It is sufficient for the blue light B to have a wavelength included in a blue color band (from 435 nm to 480 nm), such as 445 nm and 465 nm.

The light source device 10 includes a single blue LD 1 and a single collimator lens 110; however, the light source device 10 may include a plurality of blue LDs 1 and a plurality of collimator lenses 110. A number of blue LDs 1 and a number of collimator lenses 110 may be appropriately changed based on desired brightness of a projection image.

The diffusing plate 2 is not an essential component for the light source device 10. The light source device 10 may not include the diffusing plate 2 as long as the blue light emitted from the blue LD 1 is emitted from the projector 100 to the outside while being sufficiently diffused to a degree causing no problem in use. In place of the diffusing plate 2, a microlens array or a rod integrator may be used.

Figure 3:
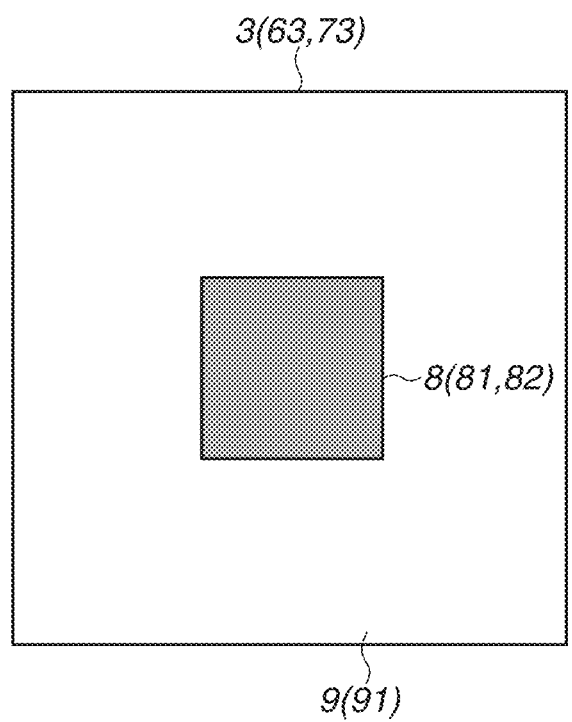
FIG. 3 is a diagram illustrating a configuration of a light guide unit according to the first exemplary embodiment, a second exemplary embodiment, and a third exemplary embodiment.

The blue light B from the diffusing plate 2 enters a first portion 8 included in a light guide unit 3. As illustrated in FIG. 3, the light guide unit 3 includes the first portion 8 and a second portion 9. More specifically, the light guide unit 3 is provided with a dichroic film having characteristics illustrated in FIG. 4 described below, on a part of a transparent glass plate. A part provided with the dichroic film is the first portion 8, and a part not provided with the dichroic film of the transparent glass plate is the second portion 9. The first portion 8 has characteristics to reflect most of the blue light B from the diffusing plate 2 and to transmit remainder of the blue light B, and to transmit the green light and the blue light. The second portion 9 has characteristics to transmit visible light.

Figure 4:
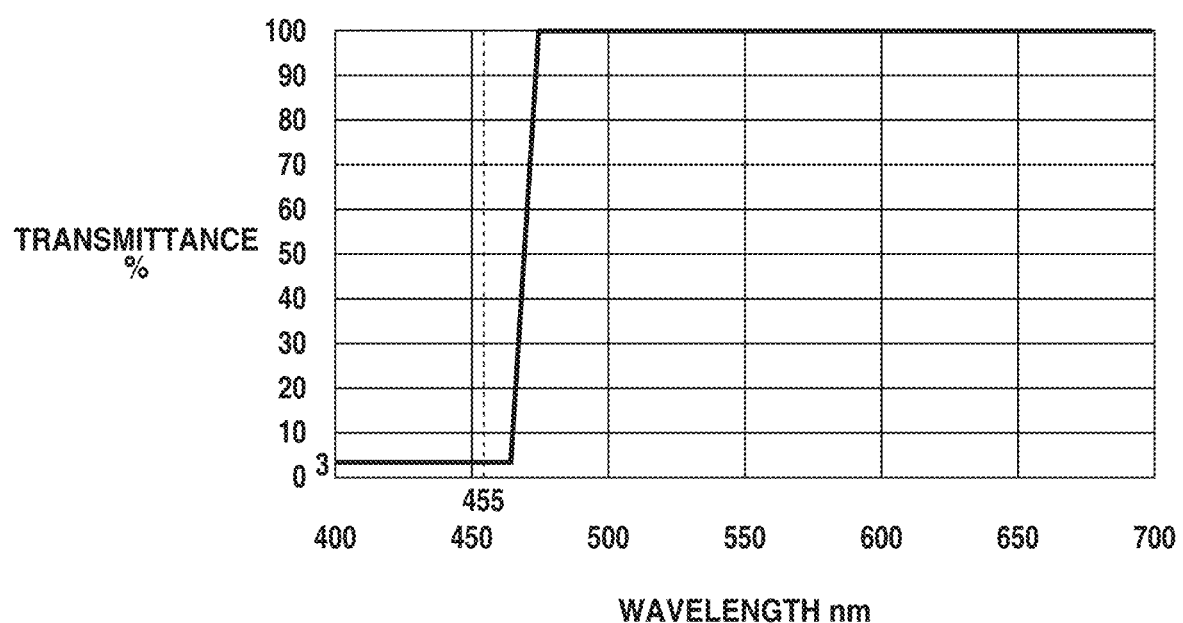
FIG. 4 is a diagram illustrating characteristics of a first portion according to the first exemplary embodiment.

In the first portion 8, as illustrated in FIG. 4, transmittance to the blue light B having the wavelength of 455 nm is 3%, whereas reflectance is 97%, and the transmittance to light having the wavelength from 470 nm to 700 nm is 100%.

The characteristics of the first portion 8 are not limited to the characteristics illustrated in FIG. 4. The light source device 10 satisfies a following conditional inequality:

$$0.01 \leq T \leq 0.16, \quad (1)$$

where T is the transmittance of the first portion 8 to the wavelength of the blue light B from the blue LD 1. The light source device 10 more preferably satisfies:

$$0.02 \leq T \leq 0.08. \quad (1a)$$

In other words, the reflectance of the first portion 8 to the blue light is not 100%. The reason is as follows. The transmittance T used herein is a ratio of a light quantity before the light passes through the first portion 8 and a light quantity after the light passes through the first portion 8. As the transmittance is higher, a larger quantity of light passes through the first portion 8.

The transmittance of the first portion 8 to the wavelength of the blue light B from the blue LD 1 is constant irrespective of the polarization direction of the blue light B.

Figure 2A:
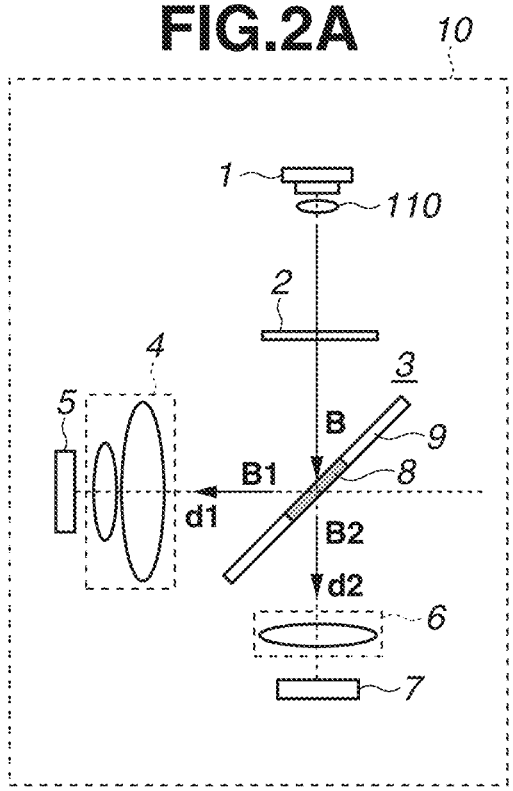
FIGS. 2A to 2D are diagrams illustrating a configuration of a light source device according to a first exemplary embodiment.

As illustrated in FIG. 2A, blue light B1 that is a most part of the blue light B from the diffusing plate 2, is reflected by the first portion 8. The blue light B1 is then guided in a first direction d1, and enters a phosphor unit (wavelength conversion unit) 5 through a first condenser lens unit 4. Blue light B2 that is a small part of the blue light B from the diffusing plate 2, passes through the first portion 8. The blue light B2 is guided in a second direction d2, and then enters a diffuser unit (diffusion unit) 7 through a second condenser lens unit 6.

The first condenser lens unit 4, which is a lens unit having positive power, is configured to converge the light from the light guide unit 3 toward the phosphor unit 5 and to convert the light from the phosphor unit 5 into parallel light. The second condenser lens unit 6, which is a lens unit having positive power, is configured to converge the light from the light guide unit 3 toward the diffuser unit 7 and to convert the light from the diffuser unit 7 into parallel light.

In FIGS. 2A to 2D, the first condenser lens unit 4 consists of two positive lenses, and the second condenser lens unit 6 consists of one positive lens. Each of the condenser lens units may further include, for example, a negative lens as long as each of the condenser lens units includes at least one positive lens and has positive power.

(Optical Path of Fluorescent Light)

Figure 2B:
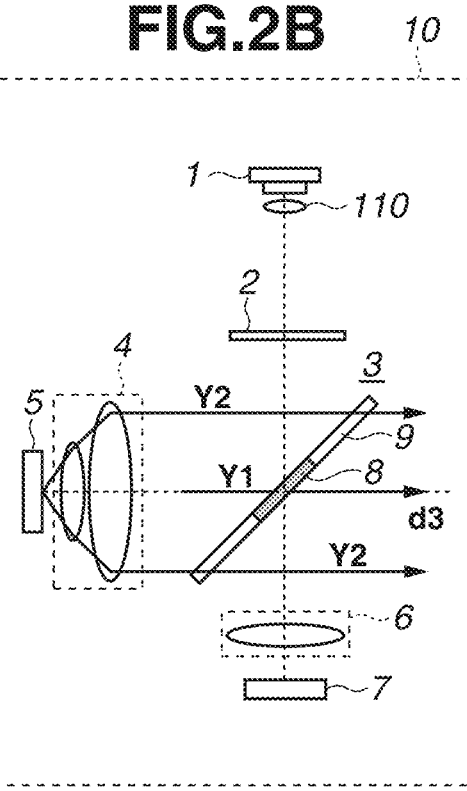

An optical path through which fluorescent light from the phosphor unit 5 is guided to the illumination optical system 20 is described with reference to FIG. 2B. A part of the blue light B1 is converted into yellow fluorescent light (light of second wavelength band) by the phosphor unit 5. The phosphor unit 5 includes a phosphor layer that performs wavelength conversion, and a reflective substrate that supports the phosphor layer and reflects fluorescent light to guide the reflected fluorescent light to the light guide unit 3. The phosphor unit 5 may have a configuration in which the rectangular phosphor layer is provided on a rectangular metal plate member, or a configuration in which the phosphor layer has an annular shape and the reflective substrate is a rotatable metal disc. When the phosphor layer and the reflective substrate are rotated, a position where the blue light B1 enters the phosphor layer is constantly changed, and thereby making it possible to improve durability of the phosphor layer.

Of the yellow fluorescent light from the phosphor unit 5, fluorescent light Y1 entering the first portion 8 passes through the first portion 8 and is guided to the illumination optical system 20 (third direction d3). Of the yellow fluorescent light from the phosphor unit 5, fluorescent light Y2 entering the second portion 9 passes through the second portion 9 and is guided to the illumination optical system 20. The first portion 8 also has characteristics to transmit the yellow light. The second portion 9 has characteristics to transmit the visible light.

A ratio of converting the blue light B1 into the yellow fluorescent light Y1 and Y2 converted by the phosphor unit 5 is preferably 60% or more, and more preferably 70% or more.

(Optical Path of Unconverted Light)

Figure 2C:
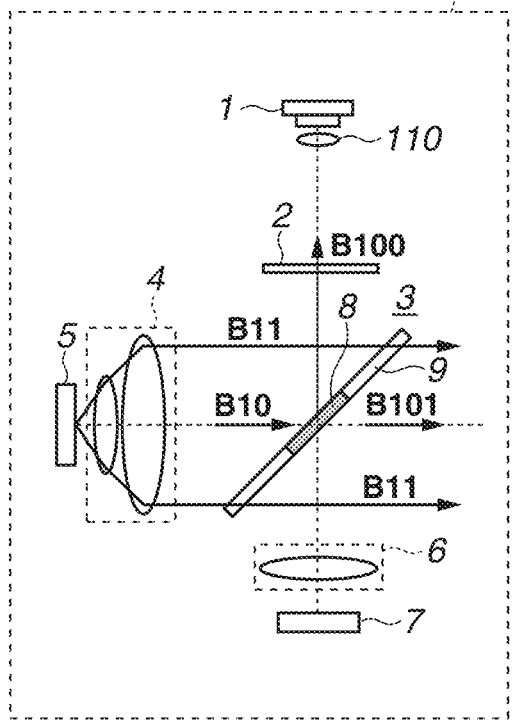

An optical path through which unconverted light from the phosphor unit 5 is guided to the illumination optical system 20 is described with reference to FIG. 2C. The unconverted light used herein is a part of the blue light B1 emitted from the phosphor unit 5 as blue light without being converted by the phosphor unit 5.

Of unconverted light B10 entering the first portion 8 of the unconverted light from the phosphor unit 5, unconverted light B101 as a small part (e.g., 3%) passes through the first portion 8 and is guided to the illumination optical system 20. Thus, the unconverted light B101 is usable as image light.

Of the unconverted light from the phosphor unit 5, unconverted light B11 entering the second portion 9 passes through the second portion 9 and is guided to the illumination optical system 20.

(Optical Path of Diffused Light)

Figure 2D:
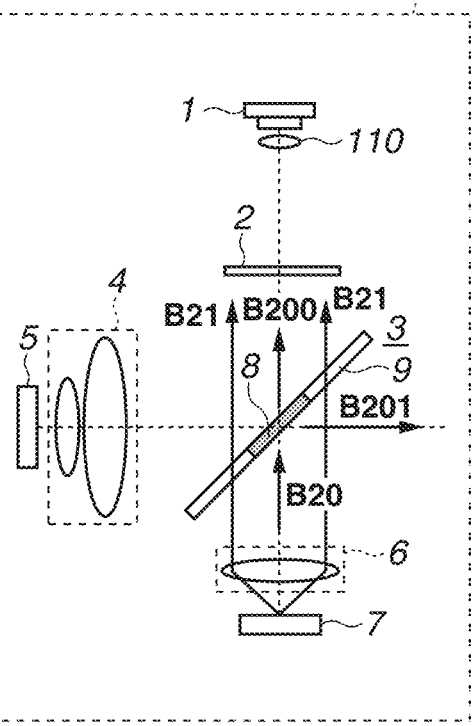

An optical path through which diffused light from the diffuser unit 7 is guided to the illumination optical system 20 is described with reference to FIG. 2D. The diffuser unit 7 includes a diffuser layer that diffuses entering light, and a reflective substrate that supports the diffuser layer and reflects the diffused light to guide the reflected light to the light guide unit 3. The diffuser unit 7 may have a configuration in which the rectangular diffuser layer is provided on a rectangular metal plate member, or a configuration in which the diffuser layer has an annular shape and the reflective substrate is a rotatable metal disc. When the diffuser layer and the reflective substrate are rotated, a position where the blue light B2 enters the diffuser layer is constantly changed, and thereby making it possible to improve durability of the diffuser layer.

The blue light B2 having entered the diffuser unit 7 is diffused and reflected by the diffuser unit 7, and is guided to the light guide unit 3. Of diffused light B20 entering the first portion 8 of the diffused light from the diffuser unit 7, diffused light B201 as a most part is reflected by the first portion 8 and is guided to the illumination optical system 20. Of the diffused light B20 entering the first portion 8 of the diffused light from the diffuser unit 7, diffused light B200 as a small part passes through the first portion 8 and is guided to the blue LD 1. Of the diffused light from the diffuser unit 7, diffused light B21 entering the second portion 9 is guided to the blue LD 1 through the second portion 9.

The blue light such as the unconverted light B11 and the diffused light B201 that has been emitted from the diffuser unit 7 and reflected by the first portion 8 of the light guide unit 3 can be guided to the illumination optical system 20 by the above-described configuration. The unconverted light B11 is not converted into yellow fluorescent light by the phosphor unit 5. The diffused light B201 is emitted from the diffuser unit 7 and reflected by the first portion 8 of the light guide unit 3. The fluorescent light Y1 and Y2 as the yellow light can also be guided to the illumination optical system 20. Consequently, the color image can be projected to the screen S. In other words, of the blue light from the phosphor unit 5 and the blue light from the diffuser unit 7, the blue light other than the blue light B100 and B200 that passes through the first portion 8 and returns to the blue LD 1 can be guided to the illumination optical system 20 and used as the image light.

(Reason why Projection of Color Image can be Realized by Configuration Simpler than Existing Configuration)

As described above, the first portion 8 included in the light guide unit 3 has dichroic characteristics in which the transmittance or the reflectance varies based on the wavelength. Further, the reflectance of the first portion 8 for the blue light emitted from the blue LD 1 is intentionally set to be lower than 100%. Configuring the light guide unit 3 in the above-described manner eliminates necessity to impart, to the polarization separation device, both of the polarization separation function to a specific wavelength and the function to transmit or reflect a wavelength other than the specific wavelength irrespective of the polarization direction, unlike Japanese Patent Application Laid-Open No. 2015-106130 described above. In other words, the light source device illustrated in the present exemplary embodiment can realize projection of a color image with the configuration simpler than the existing configuration. As details are described below, in a case where the reflectance of the first portion 8 to the blue light is 100%, the blue light of the light from the light guide unit 3 toward the illumination optical system 20 is lost in an area where the first portion 8 is provided, which is not preferable.

(Other Configuration)

Figure 5B:
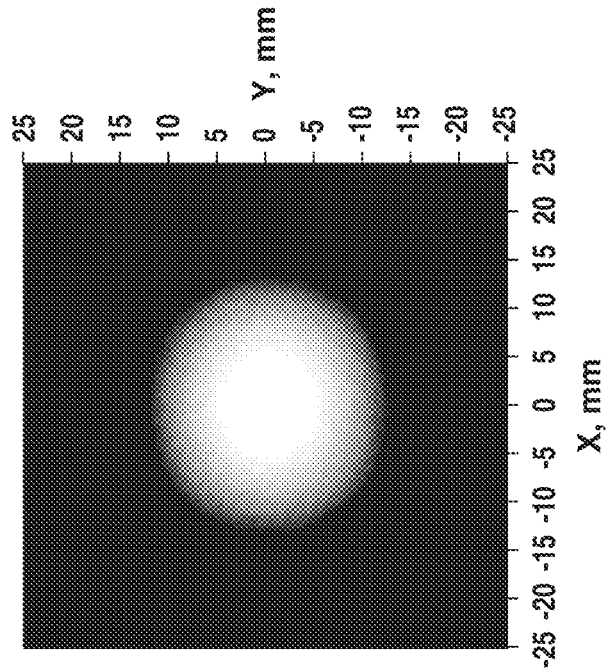
FIGS. 5A and 5B are diagrams illustrating a light quantity distribution of blue light according to a comparative example and the first exemplary embodiment, respectively.
Figure 5A:
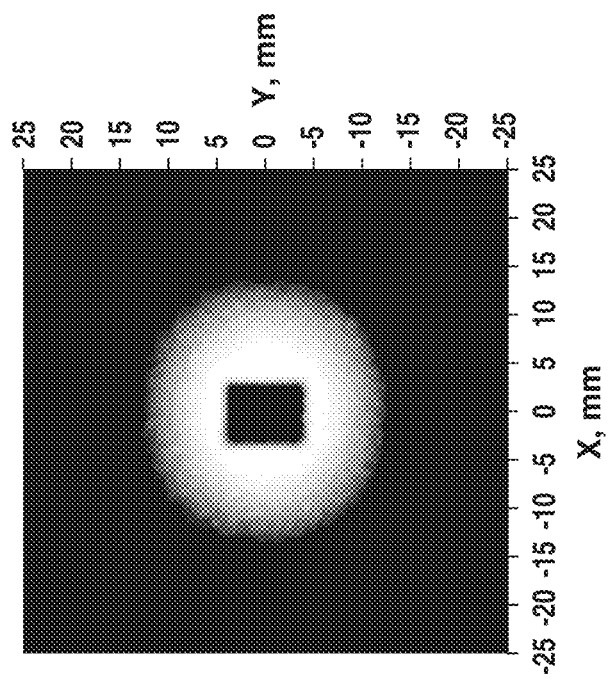

FIG. 5A illustrates a light quantity distribution, immediately before the first fly-eye lens 11, of a part of the blue light emitted from the light source device 10, more specifically, the unconverted light B11 and B101 guided to the illumination optical system 20, of the blue light from the phosphor unit 5. The light quantity distribution illustrated in FIG. 5A can be considered to be equivalent to a light quantity distribution in a case where the reflectance of the first portion 8 to the blue light is 100%, namely, in a case where blue light B2 guided to the diffuser unit 7 illustrated in FIG. 2A is not present, unlike the present exemplary embodiment.

In a case where the light quantity distribution immediately before the first fly-eye lens 11, of the whole blue light emitted from the light source device 10 is the light quantity distribution illustrated in FIG. 5A, color unevenness on the illuminated plane of the blue light modulation unit 22B may increase. Further, assume that, in a case where an aperture diameter of a diaphragm provided in the illumination optical system 20 or the projection lens 24 is varied, the aperture area of the diaphragm becomes smaller than a rectangular deficient area (black rectangular area at center) where the blue light is lost as illustrated in FIG. 5A. In this case, the blue light is not guided to the blue light modulation unit 22B. Therefore, the color of the projection image when the image including the blue color is projected may be different from the desired color.

In contrast, the light quantity distribution immediately before the first fly-eye lens 11, of the whole blue light emitted from the light source device 10 in the present exemplary embodiment does not include the deficient area as illustrated in FIG. 5B. In the present exemplary embodiment, the diffused light B202 that is the most part of the diffused light B20 entering the first portion 8 of the diffused light from the diffuser unit 7, can be guided to the illumination optical system 20. Accordingly, the deficient area of the light quantity distribution illustrated in FIG. 5A can be covered by the diffused light B201. As a result, the light quantity distribution of the blue light as illustrated in FIG. 5B can be achieved.

Next, relationship between an area of the first portion 8 and an area of the second portion 9 is described. If the area of the first portion 8 is excessively large, the light quantity of the unconverted light B11 that enters the second portion 9 and is guided to the illumination optical system 20 illustrated in FIG. 2C is reduced, which is not preferable. In contrast, if the area of the first portion 8 is excessively small, the light quantity of the diffused light B201 that enters the first portion 8 and is guided to the illumination optical system 20 illustrated in FIG. 2D is reduced, which is not preferable.

Accordingly, the light source device 10 preferably satisfies the following conditional inequality:

$$0.03 \le S_1/S_{1+2} \le 0.30, \tag{2}$$

where $S_{1+2}$ is a sum of the area of the first portion 8 and the area of the second portion 9, and $S_1$ is the area of the first portion 8, in a case where the light guide unit 3 is viewed from a normal direction of the light guide unit 3.

Further, the light source device 10 more preferably satisfies the following conditional inequality:

$$0.05 \le S_1/S_{1+2} \le 0.20. \tag{2a}$$

When the light source device 10 satisfies the conditional inequality (2), the size of the first portion 8 becomes appropriate, which makes it possible to prevent the light quantity of the blue light from being reduced.

As described with reference to FIG. 2D, in the case where the diffused light from the diffuser unit 7 enters both of the first portion 8 and the second portion 9, the diffused light B21 having entered the second portion 9 passes through the second portion 9, and is guided toward the blue LD 1.

Accordingly, as illustrated in FIG. 6A, it is preferable to cause the most of the diffused light B22 to enter the first portion 8 by preventing the diffused light B22 from the diffuser unit 7 from being excessively expanded. The light source device 10 preferably satisfies the following conditional inequality:

$$0.5 \le D1/D2 \le 1.1, \tag{3}$$

where D1 is a light flux diameter of the light flux that enters the first portion 8 from the diffuser unit 7 through the second condenser lens unit 6, and D2 is a width of the first portion 8 in a direction orthogonal to an optical axis of the second condenser lens unit 6.

Further, the light source device 10 more preferably satisfies the following conditional inequality:

$$0.6 \le D1/D2 \le 1.0. \tag{3a}$$

Satisfaction of the conditional inequality (3) by the light source device 10 indicates that the most of the diffused light B22 enters the first portion 8. Deviation from an upper limit value of the conditional inequality (3) indicates that, of the diffused light B22, a quantity of loss light that enters the second portion 9 without being guided to the illumination optical system 20 is excessively large. Deviation from a lower limit value of the conditional inequality (3) indicates that the area of the first portion 8 is excessively large. If the area of the first portion 8 is excessively large, the light quantity of the unconverted light B11 that enters the second portion 9 and is guided to the illumination optical system 20 illustrated in FIG. 2C as described above is reduced, which is not preferable.

When a diffusion angle (divergence angle) of the diffused light B22 from the diffuser unit 7 illustrated in FIG. 6A is θ1, the diffusion angle θ1 is preferably lower than or equal to 20 degrees. More preferably, the diffusion angle θ1 is 2 degrees or more and 10 degrees or less. Further, the light source device 10 preferably satisfies the following conditional inequality:

$$\theta 1/\theta 2<1.0, \qquad (4)$$

where θ2 is a diffusion angle of the unconverted light B11 or the fluorescent light Y2 from the phosphor unit 5 illustrated in FIG. 6B.

Further, the light source device 10 more preferably satisfies the following conditional inequality:

$$0.2<\theta 1/\theta 2 \le 0.8. \qquad (4a)$$

Satisfaction of the conditional inequality (4) by the light source device 10 indicates that the most of the diffused light B22 enters the first portion 8 because the diffusion angle θ1 of the diffused light B22 is small. Deviation from an upper limit value of the conditional inequality (4) indicates that, of the diffused light B22, a quantity of loss light that enters the second portion 9 without being guided to the illumination optical system 20 is excessively large. Deviation from a lower limit value of the conditional inequality (4a) indicates that the diffusion angle θ1 of the diffused light B22 is excessively small, namely, the light emitted from the blue light LD 1 as the laser beam is not sufficiently diffused by the diffuser unit 7.

The diffusion angle θ1 is measured in a manner described below. For example, first, the light quantity distribution of the light from the diffuser unit 7 on a plane orthogonal to the optical axis of a lens. The light from the diffuser unit 7 passes through a vertex of a surface on the diffuser unit side of the lens closest to the diffuser unit 7 among lenses included in the second condenser lens unit 6. Further, a full width at half maximum in the light quantity distribution is measured. An angle formed by three points is regarded as the diffusion angle θ1, the three points consisting two points corresponding to ends of the full width at half maximum on the above-described plane and a center point on an incident surface of the diffuser layer of the diffuser unit 7. The diffusion angle θ2 is also measured in a similar manner.

Figure 7:
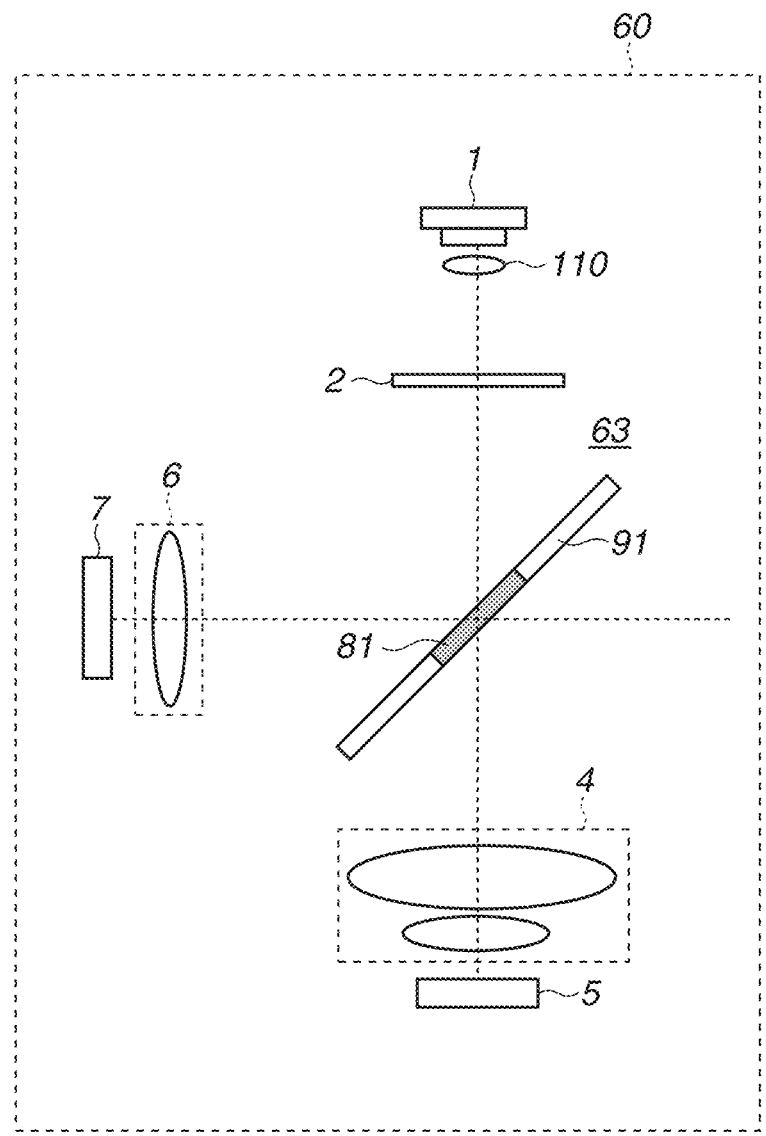
FIG. 7 is a diagram illustrating a configuration of a light source device according to the second exemplary embodiment.

A configuration of a light source device 60 according to a second exemplary embodiment of the disclosure is described with reference to FIG. 7. The components same as the components according to the above-described first exemplary embodiment are denoted by the same reference numerals, and description of the components is omitted in some cases.

In the above-described first exemplary embodiment, the second condenser lens unit 6 and the diffuser unit 7 are provided in the direction passing through the light guide unit 3 as viewed from the blue LD 1, and the first condenser lens unit 4 and the phosphor unit 5 are provided in a direction reflected by the light guide unit 3. In the present exemplary embodiment, contrary to the first exemplary embodiment, a first condenser lens unit 4 and a phosphor unit 5 are provided in a direction passing through a light guide unit 63 as viewed from the blue LD 1, and a second condenser lens unit 6 and a diffuser unit 7 are provided in a direction reflected by a light guide unit 63. Such a configuration according to the present exemplary embodiment can also achieve effects similar to the effects according to the above-described first exemplary embodiment.

The light guide unit 63 includes a first portion 81 in place of the first portion 8, and includes a second portion 91 in place of the second portion 9. The first portion 81 has characteristics to transmit most (e.g., 97%) of the blue light B from the diffusing plate 2 and to reflect remainder (e.g., 3%) of the blue light B, and to reflect the green light and the red light. The second portion 91 has characteristics to reflect visible light.

When the blue light emitted from the blue LD 1 enters the first portion 81 through the collimator lens 110 and the diffusing plate 2, most of the blue light passes through the first portion 81 and enters the phosphor unit 5 through the first condenser lens unit 4.

Yellow light from the phosphor unit 5 is reflected by the first portion 81 and the second portion 91, and is guided to the illumination optical system 20. Of the unconverted light of the phosphor unit 5, most of the unconverted light having entered the first portion 81 passes through the first portion 81 and is guided to the blue LD 1, and remainder of the unconverted light is reflected by the first portion 81 and is guided to the illumination optical system 20. Of the unconverted light from the phosphor unit 5, the unconverted light having entered the second portion 91 is reflected by the first portion 81 and is guided to the illumination optical system 20.

Of the blue light emitted from the blue LD 1 having entered the first portion 81, a small part is reflected by the first portion 81 and enters the diffuser unit 7 through the second condenser lens unit 6, and is then diffused and reflected.

Of the blue light from the diffuser unit 7, most of the blue light having entered the first portion 81 passes through the first portion 81 and is guided to the illumination optical system 20, and remainder of the blue light is reflected by the first portion 81 and is guided to the blue LD 1. Of the blue light from the diffuser unit 7, the blue light having entered the second portion 91 is reflected by the second portion 91 and is guided to the blue LD 1.

The blue light and the yellow light can be guided to the illumination optical system 20 by the above-described configuration. Therefore, the color image can be projected to the screen S.

(Other Configuration)

The reflectance of the first portion 81 to the blue light having the wavelength of 455 nm is 3%, whereas the transmittance is 97%. The reflectance to the light having the wavelength from 470 nm to 700 nm is 100%; however, the characteristics of the first portion 81 are not limited thereto. The light source device 60 preferably satisfies the following conditional inequality:

$$0.01 \le R \le 0.16, \qquad (5)$$

where R is a reflectance of the first portion 81 to the wavelength of the blue light emitted from the blue LD 1. More preferably, the light source device 60 satisfies the following conditional inequality:

$$0.02 \le R \le 0.08. \qquad (5a)$$

The reflectance R used herein indicates a ratio of the light quantity before the light passes through the first portion 81 and the light quantity after the light passes through the first portion 81. As the reflectance is higher, a larger quantity of light is reflected by the first portion 81 and a quantity of the component passing through the first portion 81 is reduced. The reflectance of the first portion 81 to the wavelength of the blue light emitted from the blue LD 1 is constant irrespective of the polarization direction of the blue light emitted from the blue LD 1.

Figure 8:
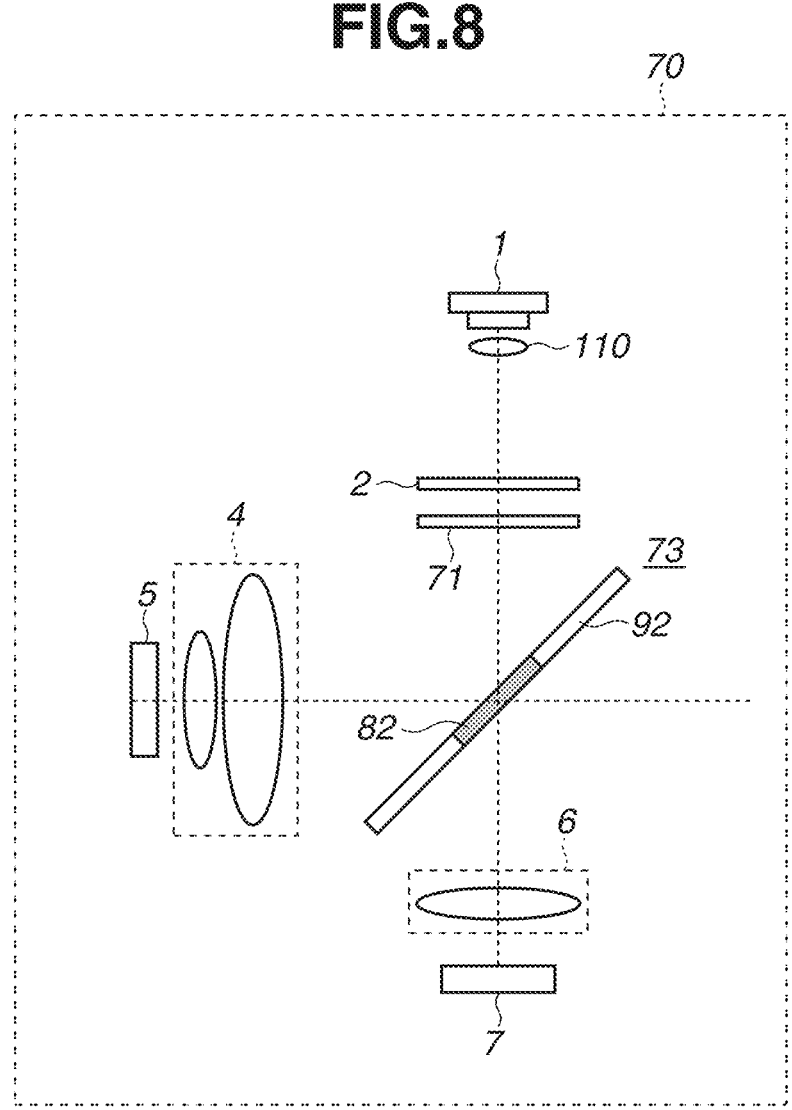
FIG. 8 is a diagram illustrating a configuration of a light source device according to the third exemplary embodiment.
Figure 9:
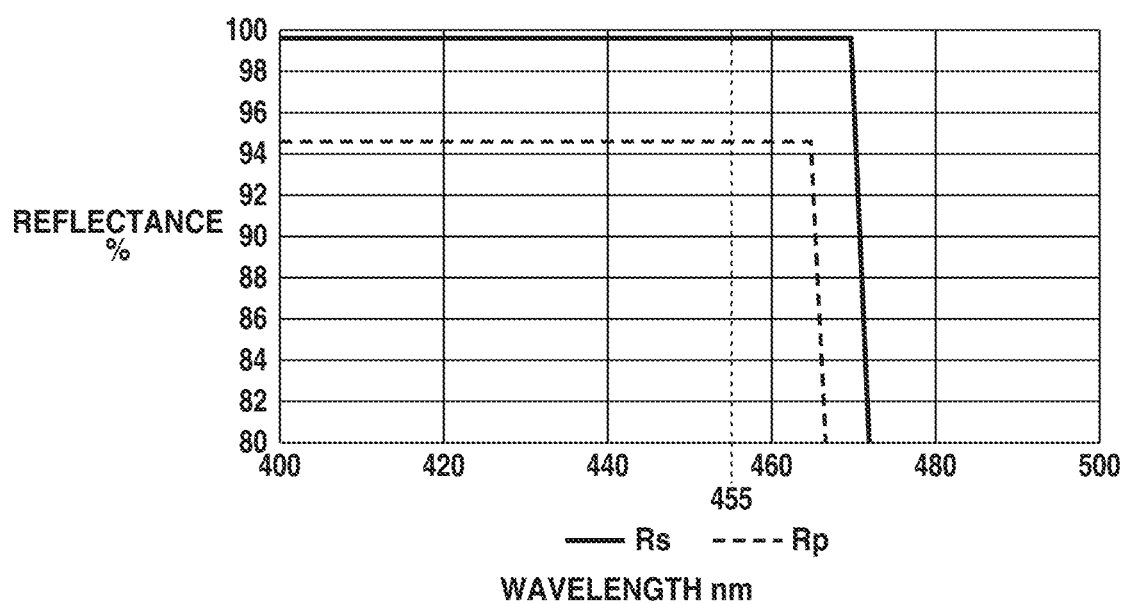
FIG. 9 is a diagram illustrating characteristics of a first portion according to the third exemplary embodiment.

A configuration of a light source device 70 according to a third exemplary embodiment of the disclosure is described with reference to FIG. 8 and FIG. 9. The components same as the components according to the above-described exemplary embodiments are denoted by the same reference numerals, and description of the components is omitted in some cases.

The present exemplary embodiment is different from the above-described first exemplary embodiment in that the configuration according to the present exemplary embodiment further includes a wave plate (phase plate) 71 and includes a light guide unit 73 in place of the light guide unit 3. The wave plate 71 is a half-wave plate, and is rotatable around a normal direction of the phase plate 71.

The light guide unit 73 includes a first portion 82 in place of the first portion 8. As illustrated in FIG. 9, the first portion 82 has characteristics to reflect 99% or more of S-polarized light of the blue light (wavelength of 455 nm) from the blue LD 1, and to reflect about 94% of P-polarized light. Although not illustrated in FIG. 9, the first portion 82 has characteristics to transmit the green light and the red light irrespective of the polarization direction.

The blue light that is the S-polarized light form the blue LD 1 enters the wave plate 71 through the diffusing plate 2. As described above, the wave plate 71 is rotatable, and the polarization direction of the blue light emitted from the blue LD 1 is changed based on a rotation angle of the wave plate 71. For example, the wave plate 71 can change the blue light that is the S-polarized light before entering the wave plate 71, to the P-polarized light, or to light in a state where an S-polarized light component and a P-polarized light component are mixed. The wave plate 71 can also change balance of the S-polarized light component and the P-polarized light component.

The reason to change the balance of the S-polarized light component and the P-polarized light component is as follows. When the balance of the S-polarized light component and the P-polarized light component included in the light from the wave plate 71 is changed, balance of a component guided to the phosphor unit 5 and a component guided to the diffuser unit 7, of the light from the wave plate 71 is changed. A part of the component guided to the phosphor unit 5 is converted into yellow fluorescent light, and the component guided to the diffuser unit 7 is still the blue light. Accordingly, when the balance of the S-polarized light component and the P-polarized light component included in the light from the wave plate 71 is changed, hue of the light from the light source device 70, in other words, a content of the blue light can be changed. The hue of the light from the light source device 70 can be changed by automatically rotating the wave plate 71 based on operation by a user or information about hue of the screen.

As compared with the above-described first and second exemplary embodiments, the configuration of the light guide unit according to the present exemplary embodiment is complicated, but can achieve a function to change the hue of the light from the light source device as described above, which is not achievable by the first and second exemplary embodiments.

In the following description, the blue light from the wave plate 71 contains the S-polarized light component of 50% and the P-polarized light component of 50%.

Of the blue light from the wave plate 71, 99% or more of the S-polarized light component is reflected by the first portion 82 and enters the phosphor unit 5 through the first condenser lens unit 4, and a part thereof is converted from the blue light into the yellow light. The yellow light from the phosphor unit 5 passes through the first portion 82 and the second portion 92, and is guided to the illumination optical system 20. Of the unconverted light having entered the first portion 82 of the unconverted light from the phosphor unit 5, 99% or more of the S-polarized light component is reflected by the first portion 82 and is guided to the blue LD 1. About 6% of the P-polarized light component is guided to the illumination optical system 20 through the first portion 82. Of the unconverted light from the phosphor unit 5, the unconverted light having entered the second portion 92 passes through the second portion 92 and is guided to the illumination optical system 20. The polarization state of the light having entered the phosphor unit 5 is largely changed by the phosphor unit 5.

Of the S-polarized light component included in the blue light from the wave plate 71, a small quantity of 1% or lower of the S-polarized light component passes through the first portion 82, and is then diffused and reflected by the diffuser unit 7 through the second condenser lens unit 6. The diffuser unit 7 is configured to maintain the polarization state of the light having entered the diffuser unit 7. Thus, the small quantity of S-polarized light component that has passed through the first portion 82 from the wave plate 71 and has entered the diffuser unit 7 is diffused and reflected by the diffuser unit 7, and most thereof is reflected by the first portion 82 and is guided to the illumination optical system 20.

Of the blue light from the wave plate 71, about 94% of the P-polarized light component is reflected by the first portion 82 and passes through the optical path same as the optical path of 99% or more of the S-polarized light component of the blue light from the wave plate 71 described above. Of the blue light from the wave plate 71, about 6% of the P-polarized light component passes through the first portion 82, and passes through the optical path same as the optical path of the small quantity of S-polarized light component of the blue light from the wave plate 71 described above.

The blue light and the yellow light can be guided to the illumination optical system 20 by the above-described configuration. Therefore, the color image can be projected to the screen S.

(Other Configuration)

As described above, reflectance Rs of the first portion 82 to the S-polarized light component of the blue light is 99% or more. Reflectance Rp to the P-polarized light component is about 94%; however, the characteristics of the first portion 82 are not limited thereto. The light source device 70 preferably satisfies the following conditional inequalities:

$$0.02 \leq Tp \leq 0.30, \quad (6)$$

$$0.00 \leq Ts \leq 0.10, \text{ and} \quad (7)$$

$$|Tp-Ts| \geq 0.02, \quad (8)$$

where Ts is transmittance of the first portion 82 to the S-polarized light component of the blue light emitted from the blue LD 1, and Tp is transmittance of the first portion 82 to the P-polarized light component. Difficulty of design in which the transmittance to the P-polarized light is increased and the transmittance to the S-polarized light is reduced is generally lower than difficulty of reversed design. Thus, the conditional inequalities (6), (7), and (8) are preferably simultaneously satisfied to realize the light source device having a simpler configuration.

As a case where the light source device 70 does not simultaneously satisfy the conditional inequalities (6), (7), and (8), a case where the difference between the transmittance Tp and the transmittance Ts is 0.02 or more but each of the transmittance is excessively large is considered. In this case, most of the blue light emitted from the blue LD 1 may be guided not to the phosphor unit 5 but to the diffuser unit 7, and the quantity of the yellow light may become insufficient, which is not preferable.

As the case where the light source device 70 does not simultaneously satisfy the conditional inequalities (6), (7), and (8), a case is considered where the transmittance Tp and the transmittance Ts are equal to each other. In this case, difficulty of the above-described deign in which the transmittance to the P-polarized light is increased and the transmittance to the S-polarized light is reduced is relatively low, but it is necessary to reduce the transmittance Tp to be close to the transmittance Ts in the case where the transmittance Tp and the transmittance Ts are equal to each other. Alternatively, it is necessary to increase the transmittance Ts to be close to the transmittance Tp. This increases the difficulty of the design, which is not preferable.

The conditional inequalities (6), (7), and (8) may be changed to following conditional inequalities:

$$0.04 \leq Tp \leq 0.16, \tag{6a}$$

$$0.00 \leq Ts \leq 0.05, \text{ and} \tag{7a}$$

$$|Tp-Ts| \geq 0.04. \tag{8a}$$

The design in which the transmittance to the S-polarized light is increased and the transmittance to the P-polarized light is reduced is increased in difficulty as described above. Unlike the present exemplary embodiment, however, the light source device may have a configuration simultaneously satisfying the following conditional inequalities:

$$0.04 \leq Ts \leq 0.16, \tag{9}$$

$$0.00 \leq Tp \leq 0.05, \text{ and} \tag{10}$$

$$|Tp-Ts| \geq 0.04. \tag{11}$$

An upper limit value of each of the conditional inequalities (8) and (8a) may be set to 0.50 or 0.30, and an upper limit value of the conditional expression (11) may be set to 0.30 or 0.16. In the present exemplary embodiment, it is unnecessary to perform substantially complete polarization separation in which the first portion 82 transmits most of the P-polarized light and reflects most of the S-polarized light.

Figure 10:
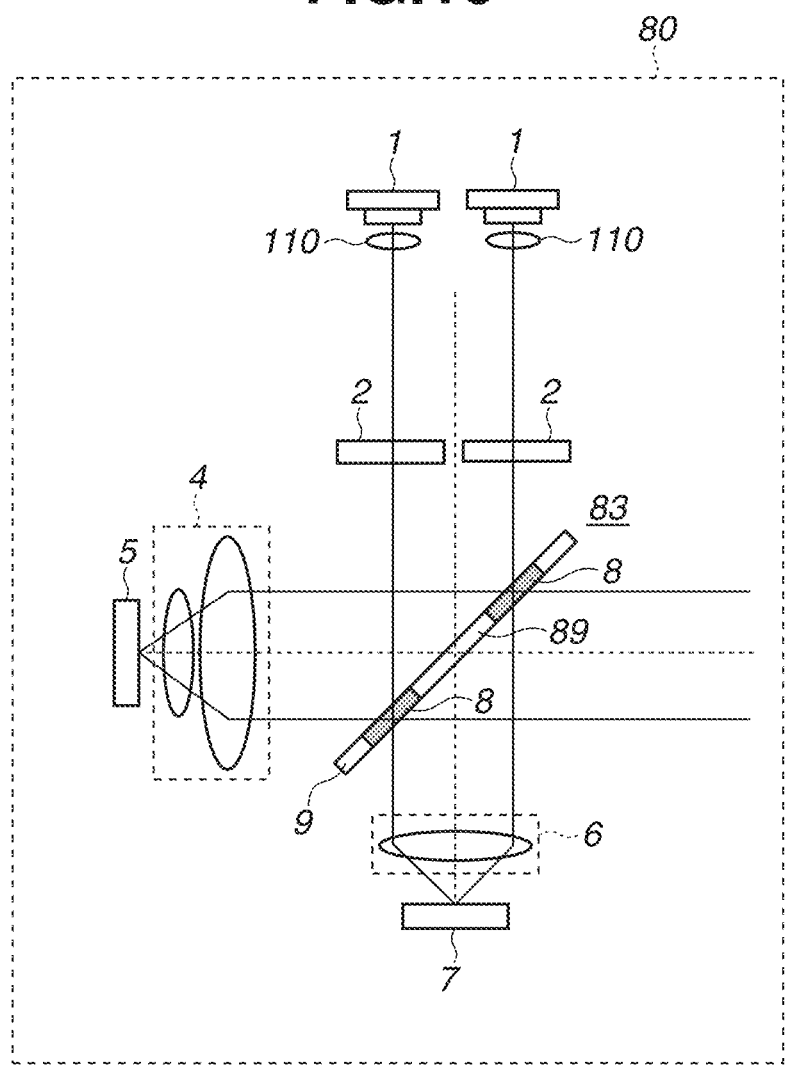
FIG. 10 is a diagram illustrating a configuration of a light source device according to a fourth exemplary embodiment.

A configuration of a light source device 80 according to a fourth exemplary embodiment of the disclosure is described with reference to FIG. 10 and FIG. 11. The components same as the components according to the above-described exemplary embodiments are denoted by the same reference numerals, and description of the components is omitted in some cases.

The present exemplary embodiment is different from the above-described first exemplary embodiment in that the configuration according to the present exemplary embodiment includes a plurality of blue LDs 1, a plurality of collimator lenses 110, and a plurality of diffusing plates 2, and includes a light guide unit 83 in place of the light guide unit 3.

Figure 11:
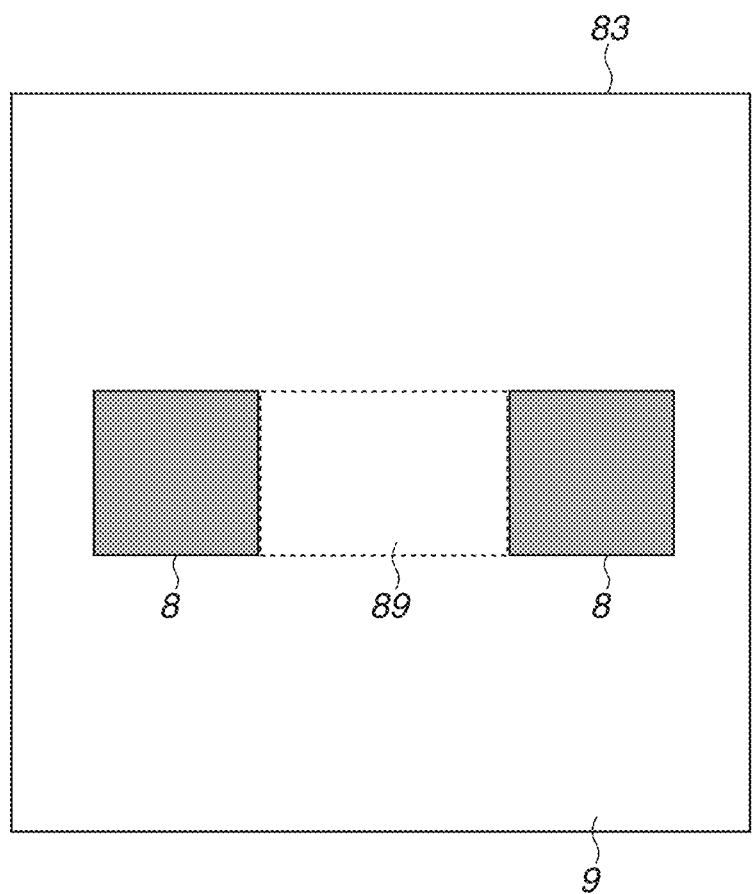
FIG. 11 is a diagram illustrating a configuration of a light guide unit according to the fourth exemplary embodiment.

The light guide unit 83 includes two first portions 8 that are provided at positions different from each other as illustrated in FIG. 11. The reason is as follows. In the present exemplary embodiment, the two first portions 8 are provided at the different positions with a predetermined distance in between, and a part 89 between the two first portions 8 is a part of the second portion 9. In other words, the part 89 has characteristics to transmit visible light, and can transmit the unconverted light having entered the part 89 of the unconverted light from the phosphor unit 5 and guide the unconverted light to the illumination optical system 20.

If the part 89 is the dichroic film same as the first portion 8, the unconverted light from the phosphor unit 5 is reflected and guided toward the blue LD 1, which becomes loss of light. In the present exemplary embodiment, the part 89 transmits the unconverted light from the phosphor unit 5, which makes it possible to effectively guide the unconverted light to the illumination optical system.

Of the blue light from the diffuser unit 7, the blue light having entered the part 89 passes through the part 89 and returns toward the blue LD 1. When the light source device 80 is configured so as to satisfy the above-described conditional expression (4) or (4a), the quantity of the blue light entering the part 89 from the diffuser unit 7 can be reduced, which is preferable.

In the present exemplary embodiment, the light guide unit 83 includes the two first portions 8; however, the number of first portions 8 is not limited as long as the light guide unit 83 includes a plurality of first portions 8 provided at positions different from one another.

(Modifications)

Although the preferred exemplary embodiments of the disclosure have been described above, the disclosure is not limited to these exemplary embodiments, and various modifications and alterations can be made within the scope of the gist of the disclosure.

For example, each of the above-described PBSs 21R, 21G, and 21B is a so-called wire grid polarization separation device; however, the disclosure is not limited to such a configuration, and each of the PBSs 21R, 21G, and 21B may have a configuration in which a polarization separation film as a dielectric multilayer film is sandwiched by prisms.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-099721, filed May 28, 2019, which is hereby incorporated by reference herein in its entirety.

What is claimed is:

1. A light source device, comprising:
   a light source unit configured to emit light of a first wavelength band;
   a light guide unit configured to guide at least a part of the light emitted from the light source unit in a direction different from an emission direction of the light source unit;
   a wavelength conversion unit configured to convert at least a part of light guided in a first direction by the light guide unit out of the light emitted from the light source unit, into light of a second wavelength band different from the first wavelength band; and
   a diffusion unit configured to diffuse at least a part of light guided in a second direction different from the first direction by the light guide unit out of the light emitted from the light source unit,
   wherein the light guide unit includes a first portion receiving the light emitted from the light source unit, and a second portion receiving the light from the wavelength conversion unit,
   wherein the first portion is configured to guide a part of the light emitted from the light source unit to the wavelength conversion unit, to guide remainder of the light emitted from the light source unit to the diffusion unit, and to guide light from the diffusion unit in a third direction that is different from the emission direction of the light source unit and is different from the first direction and the second direction, and the second portion is configured to guide light from the wavelength conversion unit in the third direction.

2. The light source device according to claim 1, wherein a following conditional inequality is satisfied:

$$0.01 \leq T \leq 0.16,$$

where T is a transmittance of the first portion to the light of the first wavelength band, and
wherein the second portion has characteristics to transmit the light of the first wavelength band and the light of the second wavelength band.

3. The light source device according to claim 2, wherein a following conditional inequality is satisfied:

$$0.02 \leq T \leq 0.08.$$

4. The light source device according to claim 2, wherein the transmittance of the first portion to the light of the first wavelength band is constant irrespective of a polarization direction of the light of the first wavelength band.

5. The light source device according to claim 1, wherein a following conditional inequality is satisfied:

$$0.01 \leq R \leq 0.16,$$

where R is a reflectance of the first portion to the light of the first wavelength band, and
wherein the second portion has characteristics to reflect the light of the first wavelength band and the light of the second wavelength band.

6. The light source device according to claim 5, wherein a following conditional inequality is satisfied:

$$0.02 \leq R \leq 0.08.$$

7. The light source device according to claim 5, wherein the reflectance of the first portion to the light of the first wavelength band is constant irrespective of a polarization direction of the light of the first wavelength band.

8. The light source device according to claim 1, wherein the light guided in the third direction by the light guide unit enters an illumination optical system.

9. A light source device, comprising:
a light source unit configured to emit light of a first wavelength band;
a light guide unit configured to guide at least a part of the light emitted from the light source unit in a direction different from an emission direction of the light source unit;
a wavelength conversion unit configured to convert at least a part of light guided in a first direction by the light guide unit out of the light from the light source unit, into light of a second wavelength band different from the first wavelength band; and
a diffusion unit configured to diffuse at least a part of light guided in a second direction different from the first direction by the light guide unit out of the light emitted from the light source unit,
wherein the light guide unit includes a first portion receiving the light emitted from the light source unit, and a second portion receiving the light from the wavelength conversion unit,
wherein a following conditional inequality is satisfied:

$$0.01 \leq T \leq 0.16,$$

where T is a transmittance of the first portion to the light of the first wavelength band, and
wherein the second portion has characteristics to transmit the light of the first wavelength band and the light of the second wavelength band.

10. The light source device according to claim 9, wherein a following conditional inequality is satisfied:

$$0.02 \leq T \leq 0.08.$$

11. A light source device, comprising:
a light source unit configured to emit light of a first wavelength band;
a light guide unit configured to guide at least a part of the light emitted from the light source unit in a direction different from an emission direction of the light source unit;
a wavelength conversion unit configured to convert at least a part of light guided in a first direction by the light guide unit out of the light emitted from the light source unit, into light of a second wavelength band different from the first wavelength band; and
a diffusion unit configured to diffuse at least a part of light guided in a second direction different from the first direction by the light guide unit out of the light emitted from the light source unit,
wherein the light guide unit includes a first portion receiving the light emitted from the light source unit, and a second portion receiving the light from the wavelength conversion unit,
wherein a following conditional inequality is satisfied:

$$0.01 \leq R \leq 0.16,$$

where R is a reflectance of the first portion to the light of the first wavelength band, and
wherein the second portion has characteristics to reflect the light of the first wavelength band and the light of the second wavelength band.

12. The light source device according to claim 11, wherein a following conditional inequality is satisfied:

$$0.02 \leq R \leq 0.08.$$

13. The light source device according to claim 9, wherein the transmittance and the reflectance of the first portion to the light of the first wavelength band are constant irrespective of a polarization direction of the light of the first wavelength band.

14. The light source device according to claim 1, wherein a following conditional inequality is satisfied:

$$0.03 \leq S_1/S_{1+2} \leq 0.30,$$

where $S_{1+2}$ is a sum of an area of the first portion and an area of the second portion, and $S_1$ is the area of the first portion in a case where the light guide unit is viewed from a normal direction of the light guide unit.

15. The light source device according to claim 14, wherein a following conditional inequality is satisfied:

$$0.05 \leq S_1/S_{1+2} \leq 0.20.$$

16. The light source device according to claim 1, further comprising a condenser lens unit that is provided between the light guide unit and the diffusion unit and has positive power,
wherein a following conditional inequality is satisfied:

$$0.5 \leq D1/D2 \leq 1.1,$$

where D1 is a diameter of a light flux that enters the first portion from the diffusion unit through the condenser lens unit, and D2 is a width of the first portion in a direction orthogonal to an optical axis of the condenser lens unit.

17. The light source device according to claim 16, wherein a following conditional inequality is satisfied:

$0.6 \leq D1/D2 \leq 1.0$.

18. The light source device according to claim 1, wherein a following conditional inequality is satisfied:

$\theta1/\theta2 < 1.0$, where $\theta1$ is a diffusion angle of the light from the diffusion unit, and $\theta2$ is a diffusion angle of the light from the wavelength conversion unit.

19. The light source device according to claim 18, wherein a following conditional inequality is satisfied:

$0.2 \leq \theta1/\theta2 \leq 0.8$.

20. The light source device according to claim 1, further comprising a wave plate provided between the light source unit and the light guide unit,
wherein the wave plate is rotatable around a normal direction of the wave plate, and
wherein a transmittance of the first portion to a P-polarized light component of the light of the first wavelength band is higher than a transmittance of the first portion to an S-polarized light component of the light of the first wavelength band.

21. The light source device according to claim 20, wherein following conditional inequalities are satisfied:

$0.02 \leq Tp \leq 0.30$, $0.00 \leq Ts \leq 0.10$, and $|Tp-Ts| \geq 0.02$, where Tp is the transmittance to the P-polarized light component, and Ts is the transmittance to the S-polarized light component.

22. The light source device according to claim 21, wherein following conditional inequalities are satisfied:

$0.04 \leq Tp \leq 0.16$, $0.00 \leq Ts \leq 0.05$, and $|Tp-Ts| \geq 0.04$.

23. A projection display apparatus, comprising:
the light source device according to claim 1;
a light modulation unit configured to modulate light emitted from the light source device; and
an illumination optical system configured to illuminate the light modulation unit using the light emitted from the light source device.

* * * * *